United States Patent [19]

Rogers, Jr.

[11] Patent Number: 5,061,035

[45] Date of Patent: Oct. 29, 1991

[54] HERMETICALLY SEALED OPTICAL FIBER ARRAYS AND METHOD FOR FORMING SAME

[75] Inventor: Harvey N. Rogers, Jr., Los Angeles, Calif.

[73] Assignee: Hughes Aircraft Company, Los Angeles, Calif.

[21] Appl. No.: 588,887

[22] Filed: Sep. 27, 1990

[51] Int. Cl.⁵ ............................................. G02B 6/04
[52] U.S. Cl. .................................... 385/115; 385/128
[58] Field of Search ............... 350/96.22, 96.24, 96.25, 350/96.27, 96.1

[56] References Cited

U.S. PATENT DOCUMENTS 4,653,846  3/1987  Yamazaki et al. ................. 350/96.2
4,984,859  1/1991  Fujigaki et al. .................. 350/96.24

FOREIGN PATENT DOCUMENTS 2023302  12/1979  United Kingdom ............. 350/96.25

Primary Examiner—John D. Lee
Assistant Examiner—John Ngo
Attorney, Agent, or Firm—M. E. Lachman; W. J. Streeter; W. K. Denson-Low

[57] ABSTRACT

Hermetically sealed optical fiber arrays comprising a bundle of metal-coated optical fibers which are sealed to each other and to a metal-coated supporting structure. The hermetic seals are formed by a process which uses fluxless solder and preferably a vacuum to enhance application of the solder.

11 Claims, 2 Drawing Sheets

HERMETICALLY SEALED OPTICAL FIBER ARRAYS AND METHOD FOR FORMING SAME

BACKGROUND OF THE INVENTION

1. Field of the Invention

The present invention relates generally to hermetically sealed optical fiber arrays and methods for forming them. More specifically, the present invention relates to hermetically sealed optical fiber arrays used in optical sensor probes, and methods of making the optical fiber arrays using fluxless soldering techniques.

2. Description of Related Art

Optical sensor probes often require optical fiber arrays that must be sealed or protected from severe environments in which they may operate. The presently used methods for providing protection or isolating the optical fiber arrays involve non-hermetically bonding the optical fibers within the arrays to each other and to metal sleeves or V-groove structures.

Typically, sealed optical fiber arrays consist of bundles of metal-coated or uncoated optical fibers which are bonded together using a variety of techniques. In the case of uncoated optical fibers, the bonding techniques involve performing two different bonding steps. First, a bundle of optical fibers is formed consisting of individual uncoated optical fibers. The uncoated optical fibers are fused together to form a glass-to-glass seal between the individual uncoated optical fibers. Then the bundle of optical fibers is bonded inside a metal sleeve or V-groove structure using an organic adhesive, such as an epoxy.

There are significant problems associated with the organic adhesives utilized to bond the bundle of optical fibers to the sleeve. The performance of the optical fiber arrays is limited by the nature of the adhesive which can absorb or transmit moisture into moisture sensitive areas. Such adhesives will outgas organic material which will compromise the adhesive bond and contaminate sensitive areas. In environments with elevated temperatures, or in environments with strong oxidizers such as liquid oxygen, organic adhesives degrade, causing adhesive bond failures.

In the case where the optical fiber arrays are fabricated with metal-coated optical fibers, the optical fibers are soldered to each other and to a metal sleeve or metal support structure. Conventional soldering techniques are utilized to facilitate the soldering procedure. These methods comprise using a soldering iron and solder with flux.

This conventional method presents significant disadvantages attributed to the flux used during the soldering procedure. The flux is free to migrate, leaving voids within the soldered area. This mechanically weakens the solder bond and allows small molecules to diffuse into the soldered area. Additionally, flux soldering techniques do not facilitate control of the length of the solder bond along the sleeve or the supporting structure.

Accordingly, there is presently a need to provide hermetically sealed optical fiber arrays. There is also a need to provide methods for fabricating hermetically sealed optical fiber arrays.

There is a further need to provide hermetically sealed optical fiber arrays in which the optical fibers are bonded together and to a sleeve or supporting structure in such a manner as to avoid outgasing from the bond.

There is additionally a need to provide hermetically sealed optical fiber arrays in which the optical fibers are bonded together and to a sleeve or supporting structure in such a manner as to avoid degradation of the adhesive bond.

SUMMARY OF THE INVENTION

In accordance with the present invention, a hermetically sealed optical fiber array is provided in which the optical fibers are held together in a compact, hermetic package such as that required for an optical sensor probe. The invention is based upon providing a hermetically sealed optical fiber array which consists of a number of optical fibers and a supporting structure. The optical fibers are soldered to each other and to the supporting structure to form a hermetically sealed optical fiber array.

As a feature of the present invention, the hermetically sealed optical fiber array avoids the use of organic adhesives in the bonds between the optical fibers and their support structure. This eliminates the potential release of organic contaminants into the sealed area with the resultant loss of hermeticity. Additionally, bond integrity between the individual optical fibers and the support structure is not compromised by severe environments such as elevated temperatures and strongly oxidizing chemicals that attack and degrade organic materials.

Another feature of the present invention is the absence of solder flux in the solder bonds. This feature avoids the mechanically weak solder bonds having voids caused by flux migration within the bonds.

The hermetically sealed optical fiber arrays of the present invention have particular application in optical fiber sensor probes utilized in hostile environments. Such applications include cryogenic liquid oxygen turbopumps for rocket engines and combustion chambers for automobile and gas turbine engines. Other applications for the optical fiber arrays of the present invention include rotation sensors for automobile and gas turbine engines.

There is also provided in accordance with the present invention a method for preparing a hermetically sealed optical fiber array. The method comprises the steps of coating the ends of each of a number of lengths of optical fibers with a solderable metal coating and forming the coated length of optical fibers into an optical fiber bundle assembly having an end face. Then the optical fiber bundle assembly is placed within a supporting structure having a front face and an inner surface so that the end face of the optical fiber bundle assembly is flush with the front face of the supporting structure. The end face of the optical fiber bundle assembly is then heated and fluxless solder is applied to the end face and allowed to flow or wick between the coated lengths of optical fibers and the inner surface of the supporting structure.

A preferred method for preparing the hermetically sealed optical fiber arrays of the present invention additionally comprises, prior to the heating step, attaching a vacuum fixture to a rear portion of the optical fiber bundle assembly so that a vacuum-tight seal is formed around the support structure. Then, simultaneous to the application of the fluxless solder, a vacuum is applied to the vacuum fixture. This causes the fluxless solder to flow more readily between the length of optical fiber and the inner surface of the support structure. The extent to which the molten fluxless solder migrates along the optical fibers is accurately controlled by appropriate placement of a heat sink.

The above-described and many other features and attendant advantages of the present invention will become better understood by reference to the following detailed description when taken in conjunction with the accompanying drawings.

DESCRIPTION OF THE PREFERRED EMBODIMENTS

The hermetically sealed optical fiber arrays of the present invention may be used in any application requiring optical fibers. Such applications include optical fiber sensor probes as well as optical fiber systems utilized to transmit additional types of information and data. Although optical fiber arrays typically include two or more optical fibers in a bundle, systems in which a single optical fiber is utilized are also within the scope of the present invention. For example, single fibers attached to electronic enclosures must be hermetically sealed to the enclosure. Although the following description of the invention will be limited to a discussion of hermetically sealed optical fiber arrays comprising at least two optical fibers, it will be understood that this is a preferred embodiment and that the invention may be used in applications in which a single optical fiber in an enclosure is utilized.

Figure 2:
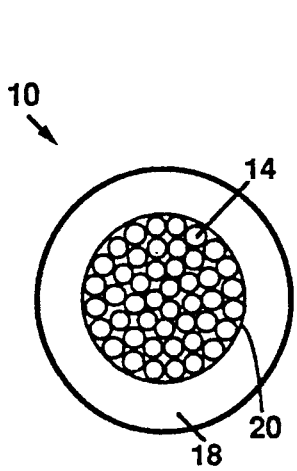
FIG. 2 is a cross sectional view of the hermetically sealed optical fiber array shown in FIG. 1.
Figure 1:
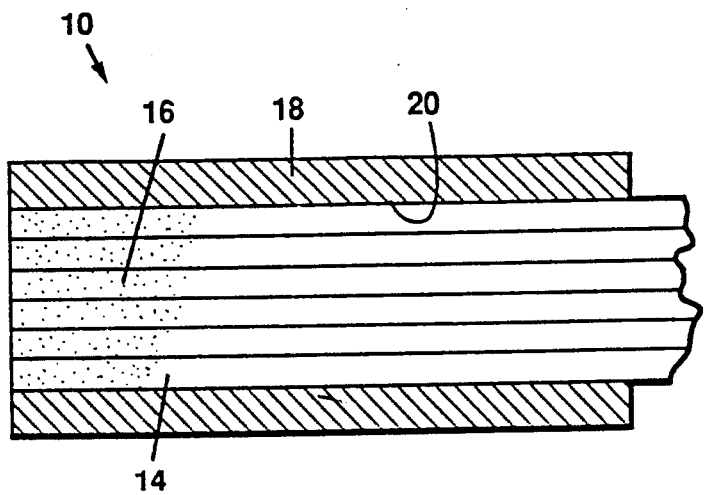
FIG. 1 is a side view of a preferred exemplary hermetically sealed optical fiber array in accordance with the present invention.

A preferred hermetically sealed optical fiber array of the present invention is illustrated in FIG. 1. An end view of the hermetically sealed optical fiber array is illustrated in FIG. 2 wherein the reference numerals correspond to the elements shown in FIG. 1. The hermetically sealed optical fiber array 10 includes a plurality of optical fibers 14. The optical fibers 14 may range in length from a few centimeters to many meters. Each fiber 14 includes a solderable metal coating on one end 16. The lengths of optical fibers are fluxless solder bonded to each other at the ends 16 to form a hermetically sealed optical fiber bundle. A supporting structure 18 surrounds the hermetically sealed optical fiber bundle and has an inner surface with a solderable metal coating 20 wherein the hermetically sealed optical fiber bundle is fluxless solder bonded to the supporting structure 18.

Figure 3:
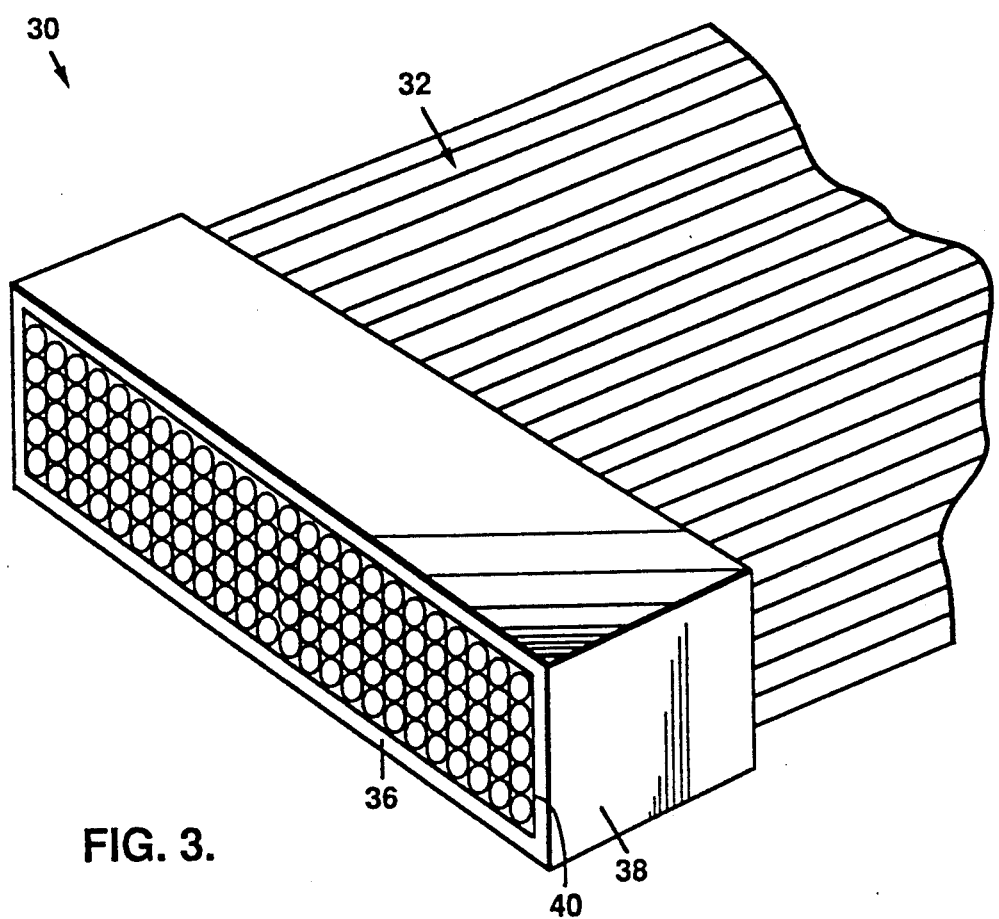
FIG. 3 is a side view of a second preferred exemplary hermetically sealed optical fiber array having a rectangular sleeve.

The optical fiber bundle can have a cross-sectional shape other than the circular shape shown in FIGS. 1 and 2 in which the supporting structure 18 is in the form of a round sleeve. This can be achieved by using a supporting structure of the desired geometry. Regardless of the cross-sectional shape, the optical fibers are hermetically sealed to each other and to the supporting structure. For example, FIG. 3 illustrates a second embodiment of the present invention having a hermetically sealed fiber optic array 30 useful in fiber optic faceplate applications. FIG. 3 depicts a plurality of optical fibers 32, each having a portion at one end with a solderable metal coating, which are aligned so that the end face of the metal-coated portion of the optical fiber bundle is flush with the front face 36 of the supporting structure 38. The metal-coated lengths of optical fibers are fluxless solder bonded to each other, forming a hermetically sealed optical fiber bundle. A supporting structure 38 in the form of a rectangular sleeve surrounds the hermetically sealed optical fiber bundle and has an inner surface with a solderable metal coating 40 wherein the hermetically sealed optical fiber bundle is simultaneously solder bonded to the supporting structure.

Figure 4:
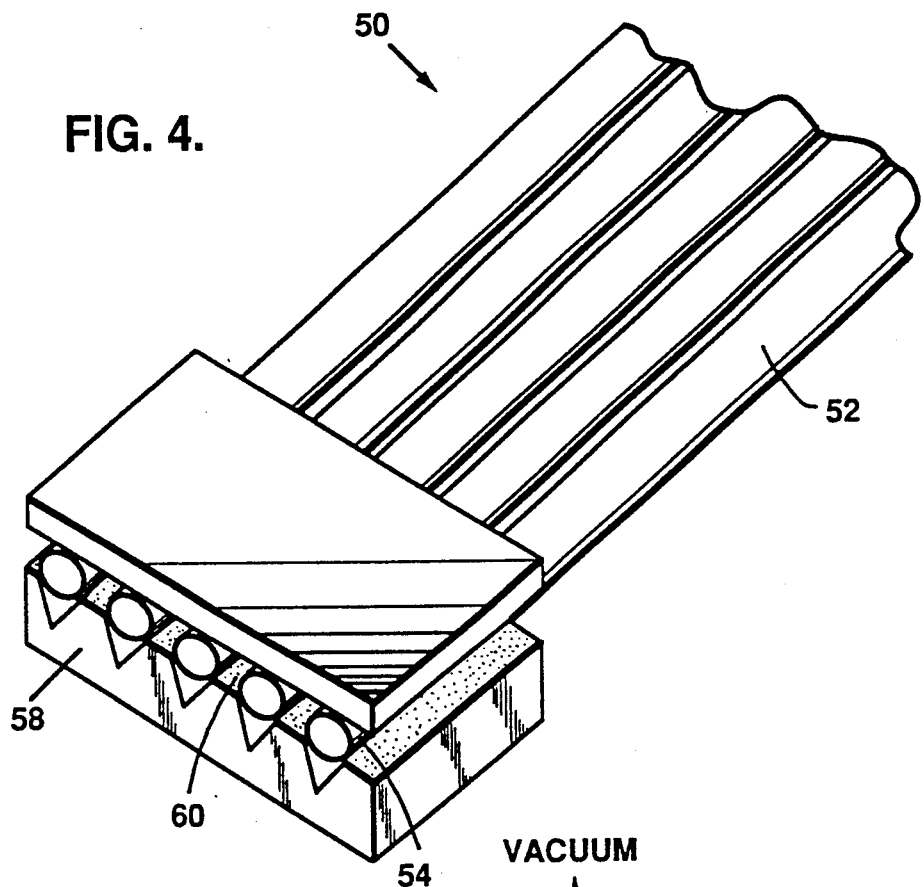
FIG. 4 is a side view of a third preferred exemplary hermetically sealed optical fiber array in a linear configuration having a V-groove supporting structure.

Another possible geometric configuration in accordance with a third embodiment of the present invention is a hermetically sealed linear optical fiber array as illustrated in FIG. 4. In contrast to the rectangular and circular geometries depicted in FIG. 1 and FIG. 3 in which the optical fibers are in a hexagonal close packing geometry, FIG. 4 illustrates a hermetically sealed optical fiber array 50 utilizing a conventional V-groove supporting structure 58. A plurality of optical fibers 52, each having a length of optical fiber at one end with a solderable metal coating 54 wherein the lengths of optical fibers are fluxless solder bonded to each other forming a hermetically sealed optical fiber bundle. A supporting structure 58 in the form of a multiple V-groove structure surrounds the hermetically sealed optical fiber bundle and has an inner surface with a solderable metal coating 60 wherein the hermetically sealed optical fiber bundle is simultaneously solder bonded to the supporting structure.

In accordance with the present invention, any conventional optical fiber known in the art can be used in the hermetically sealed optical fiber arrays. Both organic and inorganic based optical fibers are appropriate, the only limitation being that the material must have an outer surface onto which a solderable metal coating can be applied. A particularly useful optical fiber is aluminum-coated silica. These fibers offer rugged construction for demanding environments and the aluminum surface is easily coated with other metals. Typically the length of optical fiber that is surrounded by the supporting structure is from about 1 meter to about 5 meters long. The length of optical fiber at one end having a solderable metal coating is typically from about 1 centimeter (cm) to about 20 cm long.

The supporting structure can be prepared from any material which meets the physical requirements for strength, temperature stability, and chemical stability. The material must also be capable of being coated with a solderable metal coating. A particularly suitable material for the supporting structure is stainless steel. It is stable at extreme temperatures and possesses good chemical stability. As previously described, the supporting structures utilized in the hermetically sealed optical fiber arrays of the present invention can be formed in a variety of shapes. The shape is determined by the function of the optical fiber array, and can include circular or rectangular sleeves as well as V-groove support structures.

The solderable metal coating at the end of each optical fiber and on the inner surface of the support structure can be any metal which will provide a surface for adhering the fluxless solder utilized to form the bond, such as nickel, copper or palladium. The metal can also be a solderable metal alloy, such as commonly used steel alloys. A particularly effective solderable metal combination is a layer of nickel electroplated on the optical fiber or inner surface of the support structure, and a layer of gold electroplated on the nickel. The nickel provides a good surface for the subsequent soldering operation; and the gold, which is oxidation-resistant, protects the underlying nickel layer from oxidation which would inhibit the soldering process. During the soldering operation, the gold is absorbed into the solder and leaves the nickel layer exposed for soldering. The nickel is deposited to the thickness required to provide a conformal coating on the fiber or support without pinholes, which is about 2-15 micrometers, preferably about 5 micrometers. The gold is deposited to a sufficient thickness to provide a good coating without pinholes, which is about 1-15 micrometers, preferably about 5 micrometers. Other combinations of metals may be used in a similar manner. For example, copper or palladium may be substituted for the nickel and other oxidation-resistant metals, such as a noble metal, may be substituted for the gold.

A number of solders which will effectively wet the surface of the metal-coated optical fiber without the use of flux are known in the art. A particularly suitable fluxless solder for use with the nickel and gold combination mentioned above is a fluxless indium solder. Additional fluxless solders known in the art include solder comprising indium and tin, indium and silver, indium and lead, tin and lead, tin and silver, gold and tin, gold and germanium, gold and indium, bismuth and tin, bismuth and indium, and bismuth and lead.

As mentioned above, a particularly advantageous feature of the hermetically sealed optical fiber arrays of the present invention is the absence of organic adhesives and fluxes in the bond between the individual optical fibers and the bond between the optical fiber bundle and the inner surface of the supporting structure. This eliminates the possibility that organic contaminants will be released into the sealed area due to organic outgasing. Additionally, the solder bonds of the present invention neither degrade at elevated temperatures nor degrade in severely oxidizing environments which are frequent causes of bond failure in prior art sealed optical fiber arrays.

Also as mentioned above, the truly hermetically sealed optical fiber arrays of the present invention are achieved by soldering the individual optical fibers to each other and to the inner surface of the supporting structure. The solder bonds utilized in the hermetically sealed optical fiber arrays of the present invention do not contain flux. This advantageously avoids bond failure caused by the migration of flux within the bond. The ability to provide truly hermetically sealed optical fiber arrays is partly due to a novel technique for applying solder without using a flux.

In accordance with the present invention, a method is provided for preparing hermetically sealed optical fiber arrays in which fluxless solder is caused to wet and cover all or part of the solderable metal coatings to effectively form a hermetic seal. The method comprises the steps of coating the ends of a number of optical fibers with a solderable metal coating and then forming the coated length of optical fibers into an optical fiber bundle assembly having an end face. The next step consists of placing the optical fiber bundle assembly within a supporting structure having a front face and a solderable inner surface so that the end face of the optical fiber bundle assembly is flush with the front face of the supporting structure. Then the end face of the optical fiber bundle assembly is heated to a temperature which is sufficient to raise the temperature of the most distant point on the optical fiber where it is desired to perform soldering, to a temperature which is above the melting point of the particular solder being used. Fluxless solder is applied to the end face and allowed to wick between the individual optical fibers and between the inner surface of the supporting structure and the individual optical fibers.

Figure 5:
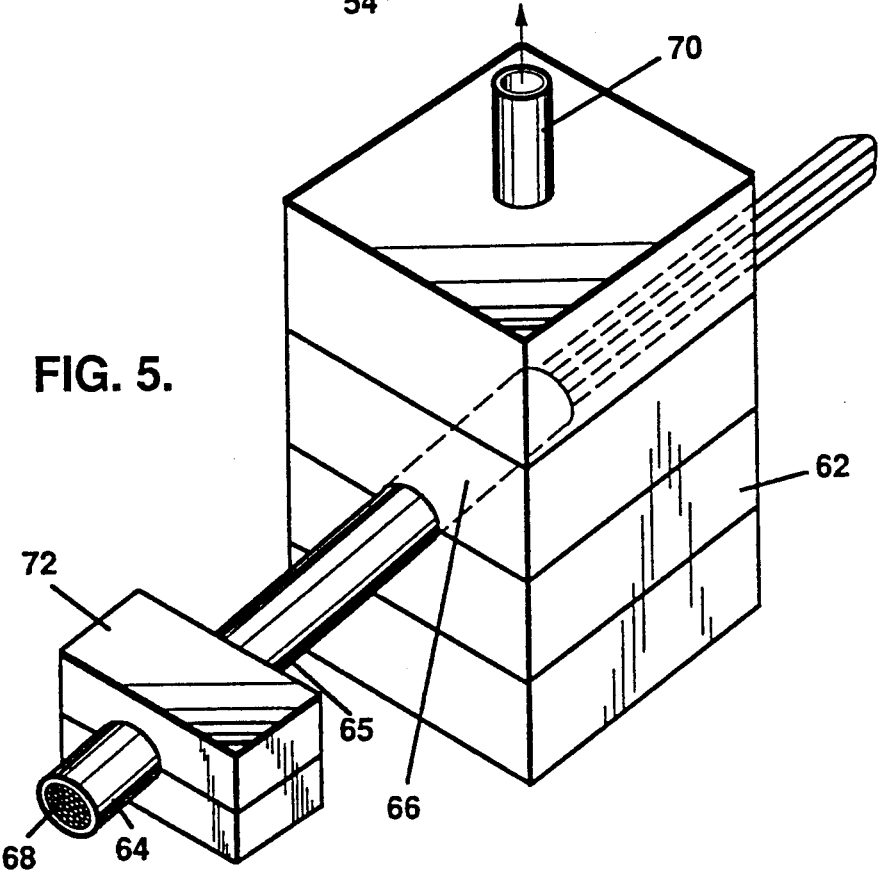
FIG. 5 is an illustration of the apparatus used in a preferred method for preparing hermetically sealed optical fiber arrays in accordance with the present invention.

The method described above wherein the fluxless solder is allowed to wick between the heated individual optical fibers achieves hermetically bonded optical fiber arrays over a short bond length. However, according to the present invention, a preferred method utilizes a vacuum to aid in applying the solder. The apparatus which is useful in applying the solder with the aid of a vacuum system is illustrated in FIG. 5. As shown in FIG. 5, the process of preparing a hermetically sealed optical fiber array with the preferred advantage of using a vacuum comprises the additional steps of, prior to the heating step, attaching a vacuum fixture 62 to a rear portion of the optical fiber bundle assembly 64 so that a vacuum tight seal is formed around the end 66 of the support structure 65. Then, simultaneous to applying the fluxless solder, a vacuum is applied through tube 70 to the vacuum fixture 62 from a vacuum source (not shown). This causes a reduction in the pressure within the support structure 65 and molten fluxless solder flows into the front face 68 of the optical fiber bundle assembly 64.

Also, according to the method of the present invention, it is preferable to attach a heat sink collar 72 around the support structure in proximity to the front face 68 of the optical fiber bundle assembly 64, to limit the distance at which the molten solder will be drawn into the support structure 65. The heat sink collar 72 will draw heat from the heated support structure 65 at the point of the heat sink collar's attachment. When the moving molten fluxless solder reaches the cooled zone in the support structure, its movement stops or significantly slows. The use of the vacuum fixture in conjunction with the heat sink collar offers the advantage of achieving a more uniform solder bond over a longer and more predictable length. It also provides accurate control over the soldering process.

In cases where the absence of moisture and air are particularly critical, it is also preferable to perform the soldering step in a dry box under a blanket of dry inert gas such as helium, nitrogen or argon. This is achieved by placing the optical fiber bundle assembly, vacuum fixture, and collar in the dry box and connecting the vacuum fixture to a vacuum source through the dry box.

After the solder bond is formed, and if desired, the front end of the hermetically sealed optical fiber array can be ground and polished flat according to conventional fiber polishing techniques. These techniques include utilizing graded SiC polishing papers and other suitable polishing compounds.

The following example illustrates both the structure of a hermetically sealed optical fiber array and a method for preparing the optical fiber array in accordance with the present invention.

EXAMPLE

Thirty-seven aluminum coated silica optical fibers, each about 2 meters long and having a 150 micron core diameter, a 180 micron clad diameter, and a 208 micron aluminum coating diameter were each electroplated first with nickel and then with gold along a length of about 2 cm at one end to a total thickness of about 8 microns. A six-inch length of stainless steel sleeve having a 0.125 inch (0.32 cm) outside diameter and a 0.0625 inch (0.16 cm) inside diameter was also electroplated on its inner surface first with nickel and then with gold to a total thickness of about 8 microns. The thirty-seven optical fibers were arranged in a circular bundle and placed inside the stainless steel sleeve so that the electroplated ends of the fibers were flush against the front face of the sleeve. The remainder of the 2 meters length of optical fibers extended out from the rear end of the stainless steel sleeve.

A vacuum fixture having rubber gaskets for sealing the stainless steel sleeve was attached to the rear end of the stainless steel sleeve so that the fibers extended out from the sleeve. A heat sink collar was placed around the sleeve approximately 2 cm from the front end. The entire unit consisting of the optical fiber bundle, stainless steel sleeve, vacuum fixture, and heat sink collar was placed in a dry nitrogen blanketed dry box.

The front end of the stainless steel sleeve was heated on a hot place to a temperature above 110° C., and a vacuum source was attached to the vacuum fixture. Fluxless indium solder, obtained from Indium Corporation of America in Ithica, N.Y., was applied to the heated front end, and molten solder was then drawn along the nickel and gold plated surfaces to approximately the position of the heat sink collar.

After completion of the soldering process, the front end of the optical fiber bundle was ground and polished, and then helium leak-tested to verify that the soldering techniques produced a truly hermetically sealed optical fiber array. Additionally, photomicrographs were obtained of the front end cross-section. These indicated that the solder completely filled the interstices between the fibers, forming a hermetically sealed optical fiber array.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A hermetically sealed optical fiber array comprising:
   a plurality of optical fibers, each of said optical fibers having a length of optical fiber at one end, said length having a solderable metal coating, wherein said lengths of optical fibers are fluxless solder bonded to each other forming a hermetically sealed optical fiber bundle; and
   a supporting structure surrounding said hermetically sealed optical fiber bundle, said supporting structure having an inner surface, said inner surface having a solderable metal coating, wherein said hermetically sealed optical fiber bundle is fluxless solder bonded to said supporting structure.

2. The hermetically sealed optical fiber array according to claim 1 wherein said supporting structure is a metal sleeve.

3. The hermetically sealed optical fiber array according to claim 2 wherein said metal sleeve comprises stainless steel having nickel electroplated on the inner surface thereof and having gold electroplated on said nickel.

4. The hermetically sealed optical fiber array according to claim 1 wherein said solderable metal coating is an electroplated coating of nickel on said length of optical fiber or said inner surface of said supporting structure, and an electroplated coating of gold on said nickel coating.

5. The hermetically sealed optical fiber array according to claim 4 wherein said electroplated coating of nickel and gold has a total thickness of about 8 microns.

6. The hermetically sealed optical fiber array according to claim 1 wherein said optical fiber is selected from the group consisting of inorganic optical fibers and organic optical fibers.

7. The hermetically sealed optical fiber array according to claim 1 wherein said optical fibers are aluminum-coated silica.

8. The hermetically sealed optical fiber array according to claim 1 wherein said length of optical fiber is from about 0.5 centimeter (cm) to about 20 cm.

9. The hermetically sealed optical fiber array according to claim 1 wherein the optical fibers in said hermetically sealed fiber optic bundle are in a hexagonal close packing geometry.

10. The hermetically sealed optical fiber array according to claim 1 wherein said hermetically sealed fiber optic bundle is arranged in a cross-sectional shape selected from the group of shapes consisting of round, rectangular, and linear.

11. The hermetically sealed optical fiber array according to claim 1 wherein said solder comprises a fluxless indium solder.

* * * * *